United States Patent Office 3,273,994
Patented Sept. 20, 1966

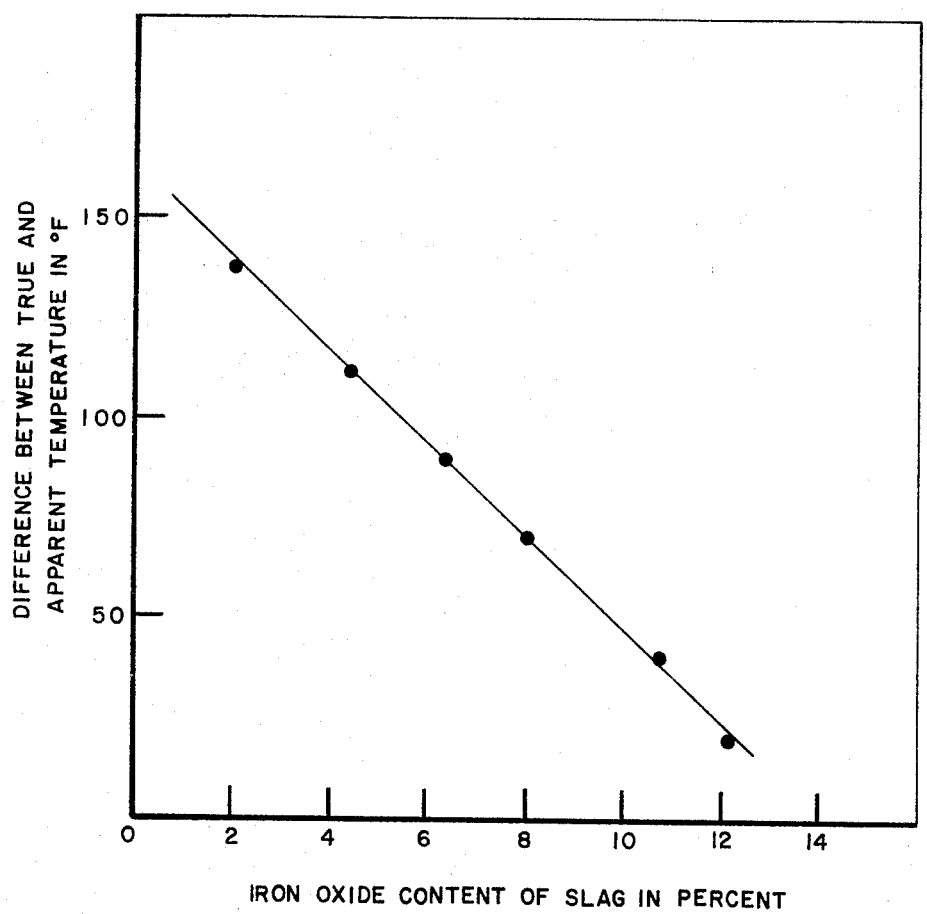

3,273,994
FOUNDRY MELTING METHOD
William H. Moore, Purchase, N.Y., assignor to Meehanite Metal Corporation, a corporation of Missouri
Filed Jan. 13, 1964, Ser. No. 337,197
3 Claims. (Cl. 75—43)

This invention relates to an improved method of control of the foundry melting process and, more particularly, to the control of the slagging procedure, which is an integral part of any melting operation.

It is well known, that various impurities present in the metallic charge in the fuel used for melting and produced during the melting process, are fluxed away from the metal by means of slag. In most melting processes the nature and composition of the slag bear a direct relationship to the quality of the metal produced.

The metallic oxide content of the slag, which comprises iron oxides, and silicon and manganese oxides in a ferrous melting process, are particularly important in determining the success of the melting operation. Thus, a high metallic oxide content in the slag is indicative of a high oxidizing condition during melting. Excessively oxidizing conditions during melting lead to inclusions, blowholes, and other defects in the castings made from the metal produced under these conditions, whereas excessively reducing conditions, indicated by a low metallic oxide content in the slag, will lead to defects such as gasification, hot tears and other dendritic conditions caused by the presence of hydrogen in the melt.

This invention has, as its principal object, a means of providing a rapid evalution of the iron oxide content of the flux, or slag produced during melting. Another object is to provide a means for controlling and adjusting melting conditions, so as to produce a degree of oxidation compatible with optimum metal quality.

Another object is to provide a means of controlling melting temperature and slag color.

Still further objects will be apparent from the specification and drawings, in which:

FIGURE 1 is a calibration curve showing the relationship between iron oxide content of the slag and the difference between the true and apparent temperature of the slag.

I have discovered that there is a direct relationship between the iron oxide content of the slag produced in melting a ferrous bath and the apparent optical temperature of the slag, and this relationship may, therefore, be used as a means of evaluating and controlling the degree of oxidation during melting. While my invention relates to all types of melting procedures used for melting cast iron, pig iron, and steel, I will use the method as applied to the cupola melting of cast iron, as a means of illustrating the invention, although I wish in no way to be limited to this preferred method of measurement, or to the melting of cast iron in a cupola.

When the temperature of a slag sample is measured by means of an optical pyrometer, a true reading cannot be obtained because of the emissivity of the slag, which does not allow the temperature instrument, or pyrometer, to record true on black body temperature. With a so-called black body, where all light waves are radiated from the body, the pyrometer reading, or apparent temperature, is a true one and would correspond to the temperature reading obtained by means of an immersion thermocouple. With a body which has an emissivity less than absolute, where only part of the light waves are emitted, the optical pyrometer reading will be inaccurate, unless the emissivity factor is known, and a suitable correction to the apparent reading is made. Molten metals, such as cast iron, pig iron, and steel, have fairly well known emissivity factors, so that in reading the temperature of these metals by optical means, it is possible to make a correction for emissivity and obtain the true, or immersion temperature reading. In the case of a slag, the emissivity factors are not well known, and are so variable, that the determination of true slag temperature by optical means is completely impracticable. Special filters are used in certain pyrometers to produce true black body conditions, thereby eliminating the difficulty of reading the temperature of molten slag. Immersion thermocouples may also be used for this purpose.

In the process of my invention, as a first step, I determine the true actual temperature of a slag sample, or bath. This may be done with an instrument, such as a radiation pyrometer, adjusted to give black body readings, or by means of an immersion thermocouple. It it may also be approximated very closely by measuring the true temperature of the molten metal bath, which is in contact with the slag bath. As they are in contact, the actual true temperature of the slag and the true temperature of the metal are very close to the same.

As a second step, I determine the apparent temperature of the slag by means of an optical pyrometer, which is by no means adjusted for emissivity. The difference between the true temperature obtained in Step 1 and the apparent temperature obtained in Step 2, is due to the emissivity of the slag. This emissivity, I have discovered, is related directly to the iron oxide content of the slag, so that I am able to use the emissivity factor, or difference between the reading of Step 1 and Step 2, as a means of measuring the iron oxide content of the slag. I am then able to make the adjustments in melting technique, well known to those skilled in the art, to either increase or decrease the degree of oxidation in melting and the iron oxide content of the slag to that value most suited for the type of metal being melted. Examples of such adjustments in cupola operation would consist of lowering the amount of air to decrease the degree of oxidation, or, alternatively, increasing the amount of coke used for the same purpose. In the case of a batch melting type of operation using gas or oil as a fuel, a normal adjustment for decreasing oxidation would consist in changing the color of the flame by supplying more or less fuel, in relation to the amount of air used. In the case of an electric melting operation, such an adjustment might consist of adding a carbonaceous material to the bath to decrease the degree of oxidation, or adding iron oxide to the bath, to increase the degree of oxidation.

The object of this invention is not to provide specific means of decreasing or increasing the degree of oxidation during melting, as these methods are rather well known, it is, instead, to provide a means of determining the degree of oxidation, so that, in turn, suitable adjustments may be made.

The working of this invention may be appreciated from the following example applied to cupola melting:

A cupola was charged and operation commenced. After two hours of melting, the true temperature of the slag running from the front slagging trough was measured by means of a platinum couple and it was found to be 2750° F.

At substantially the same time, a temperature reading was taken of the slag using an optical pyrometer, which did not contain a filter to adjust for emissivity. This apparent temperature was found to be 2690° F.

The difference between the true temperature (T.T.) and the apparent temperature (A.T.) was, therefore, 60° F. According to FIGURE 1 this corresponds to an iron-oxide content of the slag of 8.8%. As this was considered too high, the wind volume used for melting was decreased. After another 30 minutes of melting the same temperature readings of the slag were taken. The true temperature (T.T.) was found to be 2780° F. and the apparent temperature (A.T.) was found to be 2680° F. The difference in this case was 100° F., which, on FIGURE 1 corresponds to an iron oxide content of 5.4%. At the same time the color of the slag changed, so that it appeared lighter, indicating less degree of oxidation.

FIGURE 1 was prepared previously by running a series of heats with varying degrees of oxidation. Several simultaneous temperature readings were taken i.e., A.T. and T.T. and at each reading a sample of slag was taken for chemical analysis of iron oxide content. The iron oxide content was plotted against the difference in reading between the true temperature and the apparent temperature, giving the relationship shown in FIGURE 1.

This relationship may also be established by using two optical or two radiation pyrometers for reading both true temperature and apparent temperature. When this is done, the true temperature pyrometer contains suitable filtering media to negate the effects of emissivity, whereas the apparent temperature pyrometer contains no compensating filters for emissivity.

As the composition of the slag, other than its iron oxide content, has some effect on emissivity, I find it preferable to construct a calibration curve, such as FIGURE 1, for each given operation. By doing this the iron oxide content becomes the chief variable. For example, with a basic slag, high in CaO and MgO, but relatively low in SiO, the exact relationship between iron oxide content and emissivity factor may not be numerically the same, as with an acid slag, which is relatively low in MgO and CaO and relatively higher in $SiO_2$ content. For this reason it is better to determine the relationship shown in FIGURE 1 for each operation and type of slag.

In melting practice it is relatively easy to control the composition of the slag, other than iron oxide content, because this is determined by the relative amounts of fluxing materials that are used during the melting process. Iron oxide content, however, is determined principally by the degree of oxidation in melting, so that my invention provides a means of establishing this degree of oxidation in an accurate manner and immediately, thereby allowing the melting conditions to be varied, as desired.

As the degree of oxidation in melting may change, without warning and in a short period of time, it is not possible to rely on chemical analysis as an operating guide, because chemical analysis methods for iron oxide content are time consuming and several variations in degree of oxidation may take place while the iron oxide content is being determined in the laboratory by chemical means.

By using the process of my invention the degree of oxidation of the slag may be determined substantially instantaneously. For example, a very convenient method is to use recording pyrometers to give both the true temperature of the slag and its apparent optical temperature. By doing this, continuous and instantaneous determinations of the iron oxide content of the slag may be made, and the adjustments to vary this iron oxide content may be made by the furnace operator.

While I have described this invention with a certain degree of particularity, it is understood that disclosure of the preferred form has been made only by way of example, and that numerous changes in detail may be resorted to, without departing from the spirit and scope of the invention hereinafter claimed.

What is claimed is:
1. The process of rapidly determining the iron oxide content of a foundry slag utilized in the melting of iron and steel, comprising the steps of, constructing a calibration curve by selecting a plurality of different calibration slag samples and for each sample chemically measuring the iron oxide content and also measuring the true and apparent temperatures and plotting iron oxide values on a first axis and the difference between true and apparent temperatures on a second axis to form the calibration curve, measuring the true and apparent temperature of the foundry slag, projecting the difference between true and apparent temperature from the second axis and at right angles thereto to its intersection with the previously constructed calibration curve and then projecting this point on the curve to the first axis and in a direction at right angles thereto to determine the iron oxide content of the foundry slag without the necessity of chemical analysis.

2. The method of controlling the degree of oxidation during a metal melting operation through the iron oxide content of the foundry slag comprising the steps of, constructing a calibration curve by selecting a plurality of different calibration slag samples and for each sample chemically measuring the iron oxide content and also measuring the true and apparent temperatures and plotting iron oxide values on a first axis and the difference between true and apparent temperatures on a second axis to form the calibration curve, measuring the true and apparent temperature of the foundry slag, projecting the difference between true and apparent temperature from the second axis and at right angles thereto to its intersection with the previously constructed calibration curve and then projecting this point on the curve to the first axis and in a direction at right angles thereto to determine the iron oxide content of the foundry slag without the necessity of chemical analysis, making adjustments in the melting technique to give another iron oxide content and determining the iron oxide content of the foundry slag as aforesaid and continuing this procedure until the correct iron oxide content is reached.

3. The process of rapidly determining the iron oxide content of a foundry slag utilized in the melting of iron and steel, comprising the steps of, constructing a calibration curve by selecting a plurality of different calibration slag samples, and for each sample measuring the iron oxide content and measuring the true and apparent temperatures and plotting iron oxide values on a first axis and the difference between true and apparent temperatures on a second axis to form the calibration curve, measuring the true and apparent temperature of the foundry slag, projecting the difference in true and apparent temperature from the second axis to its intersection with the previously constructed curve and then projecting this point on the curve to the first axis to determine the iron oxide content of the foundry slag.

No references cited.

DAVID L. RECK, *Primary Examiner.*

N. F. MARKVA, *Assistant Examiner.*